United States Patent [19]

Atkin et al.

[11] Patent Number: 4,681,377
[45] Date of Patent: Jul. 21, 1987

[54] FLEXIBLE BELT FOR ENDLESS TRACKS MADE FROM A PLURALITY OF SEGMENTS

[75] Inventors: Howard S. Atkin, Sutton Coldfield; Geoffrey A. Forth, Hartford, both of England

[73] Assignee: Dunlop Limited, England

[21] Appl. No.: 753,046

[22] Filed: Jul. 2, 1985

[30] Foreign Application Priority Data

Jul. 17, 1984 [GB] United Kingdom ............... 8418190

[51] Int. Cl.⁴ .......................................... B62D 55/24
[52] U.S. Cl. ........................... 305/35 EB; 305/38; 403/339; 403/341
[58] Field of Search ............... 305/35 EB, 35 R, 37, 305/38; 403/339, 340, 341, 388, 393; 198/844, 847; 24/31 L

[56] References Cited

U.S. PATENT DOCUMENTS

| | | | |
|---|---|---|---|
| 910,510 | 1/1909 | Davis | 403/339 X |
| 3,107,128 | 10/1963 | Ruane | 305/35 EB |
| 3,958,839 | 5/1976 | Nodwell | 305/35 R |

FOREIGN PATENT DOCUMENTS

| | | | |
|---|---|---|---|
| 424758 | 9/1974 | U.S.S.R. | 305/35 EB |
| 676488 | 7/1979 | U.S.S.R. | 305/35 EB |

Primary Examiner—David A. Scherbel
Attorney, Agent, or Firm—Stevens, Davis, Miller & Mosher

[57] ABSTRACT

A flexible belt, particularly suitable for use as a track for a track-laying vehicle, is constructed from segments having overlapping faces provided with traction-transmitting formations (16–20; 21–24). The formations may be ribs formed along their side edges with teeth 25 and recesses 26 which interlock with corresponding formations on an adjacent segment.

9 Claims, 5 Drawing Figures

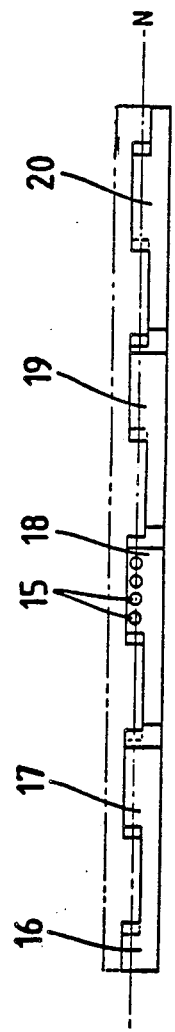
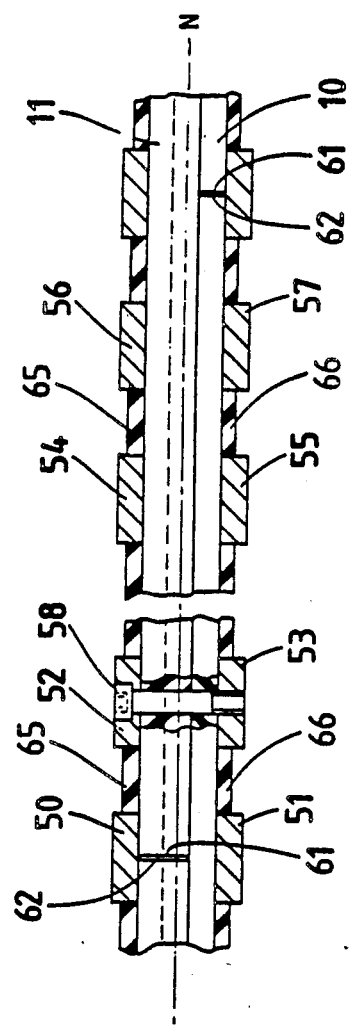
FIG. 2
FIG. 3

FLEXIBLE BELT FOR ENDLESS TRACKS MADE FROM A PLURALITY OF SEGMENTS

This invention relates to a flexible belt.

In known conveyor belts a joint is normally required to create an endless belt from a flat strip of reinforced elastomeric material. The joint may be permanent, or may involve a detachable coupling device which enables the belt joint to be dismantled for replacement or repair.

The present invention is concerned with the problem of providing a flexible belt incorporating a nonpermanent easily assembled joint or joints which is or are capable of transmitting high tensile loads and suitable for use in environments where solid and/or liquid contaminants may tend to enter a joint. In a preferred example the invention is applicable to the construction of a track for a track-laying vehicle, but it is also applicable to other fields of use, for example in belt conveyors.

According to the invention, a flexible belt comprises at least one belt segment, adjacent segment ends being secured to one another by clamping means arranged to press overlapping faces of the respective adjacent segment ends towards one another, each of the overlapping faces being provided with traction-transmitting formations arranged to interlock with corresponding traction-transmitting formations provided on the other of the overlapping faces so as to key the overlapping faces together.

A plurality of belt segments may be arranged in half-lapping series so that each segment overlaps half the length of each of the adjacent segments. Clamping means may take the form of clamping plates on opposite sides of the belt which are pressed towards one another by fixing bolts passing through the plates and the belt segments.

The traction-transmitting formations may take the form of a series of ribs and intervening grooves extending longitudinally of each belt segment, the sides of the ribs having, for example, a crenellated pattern which interlocks with that of an adjacent segment.

One embodiment of the invention will now be described, by way of example, with reference to the accompanying drawings, in which:

FIG. 2 is a diagrammatic end view of one segment taken in the direction of the arrow II of FIG. 1;

FIG. 3 is a diagrammatic side view taken in the direction of the arrow III of FIG. 1, showing the incorporation of the section of belting of FIGS. 1 and 2 in a track for a track-laying vehicle;

Figure 1:
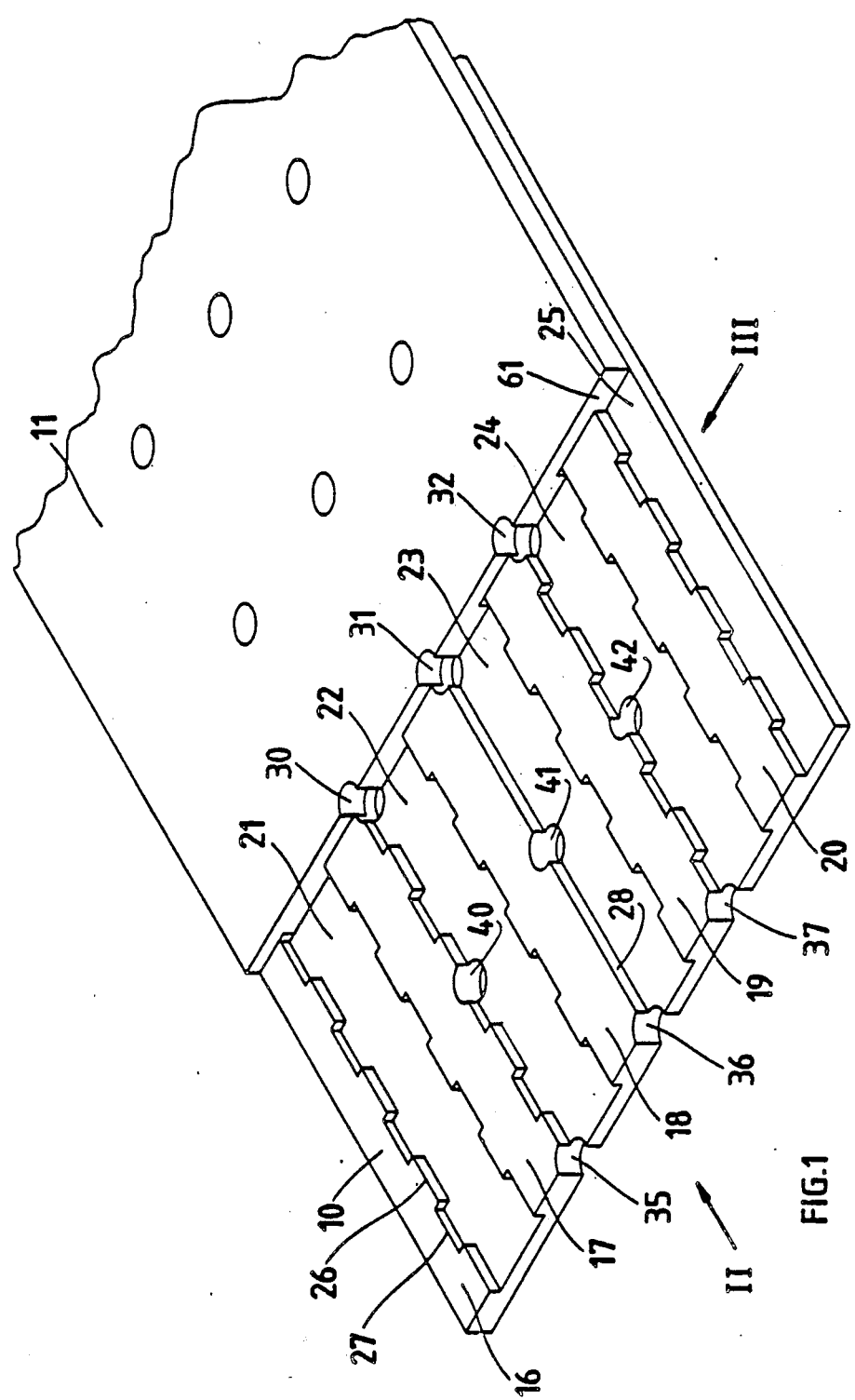
FIG. 1 is a diagrammatic isometric view of part of a section of belting made up from two segments in face-to-face relationship.

The belting section shown in FIGS. 1 and 2 comprises identical segments 10 and 11 which are arranged in a series of such segments, the segments 10 and 11 being face-to-face and in a halflapping relationship with one another and with adjacent segments (not shown), respectively.

Only half of the segment 10 is shown in FIG. 1, but the remaining half is similarly patterned to engage the corresponding pattern of the segment 11. The segments are of rubber or other elastomeric material reinforced by longitudinally extending cords 15 (see FIG. 2) of high strength aromatic polyamide material such as "KEVLAR" (Registered Trade Mark). The cords 15 are moulded into ribs 16, 17, 18, 19, and 20 running longitudinally of the segment 10 on its upper surface as seen in FIG. 1 and separated by grooves 21, 22, 23, 24 and 25. (Only the cords 15 in the rib 18 are illustrated, but all of the ribs are similarly reinforced).

The ribs 16 to 20 are formed along their side edges with a crenellated pattern including teeth 26 and recesses 27 which are arranged to interlock, in the assembled face-to-face state of the segments 10 and 11, with corresponding formations on the segment 11 which is of identical shape to that of the segment 10. It will be noted that the rib 18 is formed with one plain side 28 which lies on the central longitudinal line of the segment and thus permits the use of exactly similar segments 10 and 11, the segment 11 being simply rotated about the longitudinal centre line or neutral axis N to enable it to be fitted face to face against the segment 10 with its teeth 26 and recesses 27 in interlocking engagement with the corresponding formations of the segment 10 as shown.

Holes 30, 31, 32 are formed at the junction of successive upper segments, and similar holes 35, 36, 37 are formed along the line of junction between the segment 10 and the next adjacent lower segment (not shown). A further row of holes 40, 41, 42 is provided in the central region of each half-segment, so that each segment has nine holes contained wholly in the segment, and six half-circular holes 35, 36, 37, 30, 31, 32 which combine with similar half-circular holes on the adjacent segments.

Figure 5:
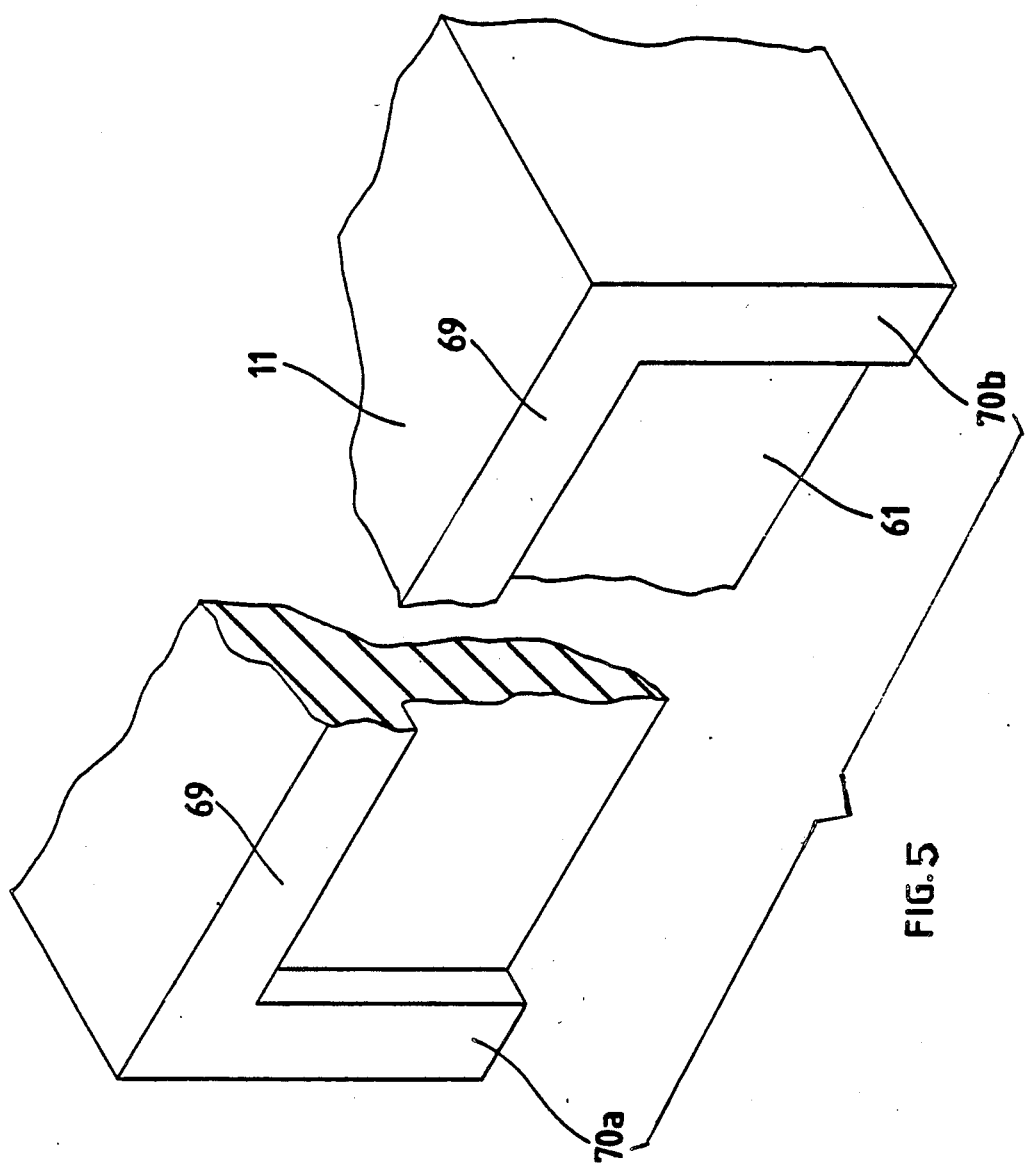
FIG. 5 is an enlarged view of part of the end of a segment when provided with lips.

When the segments 10, 11 and similar adjacent segments are assembled together in face-to-face relationship to form a section of belting, for example as seen in FIG. 3, clamp plates 50, 51; 52, 53; 54, 55; 56, 57, are secured on opposite sides of the segments 10, 11 by means of bolts 58 passing through the holes in the segments and engaging nuts or threaded apertures in one of the clamp plates to apply a compressive force to the segments. The provision of clamp plates and bolts along the end faces 61, 62 where the adjacent segments abut one another ensures that the joints between these end faces are firmly held and protected against the ingress of water and grit which might adversely affect the life of the belt. In order to enhance the sealing of the joints between the segments, it may be advantageous to form the edges of the abutting surfaces of the respective segments with small raised lips 69, 70a and 70b (see FIG. 5) to engage the opposite surfaces.

Figure 4:
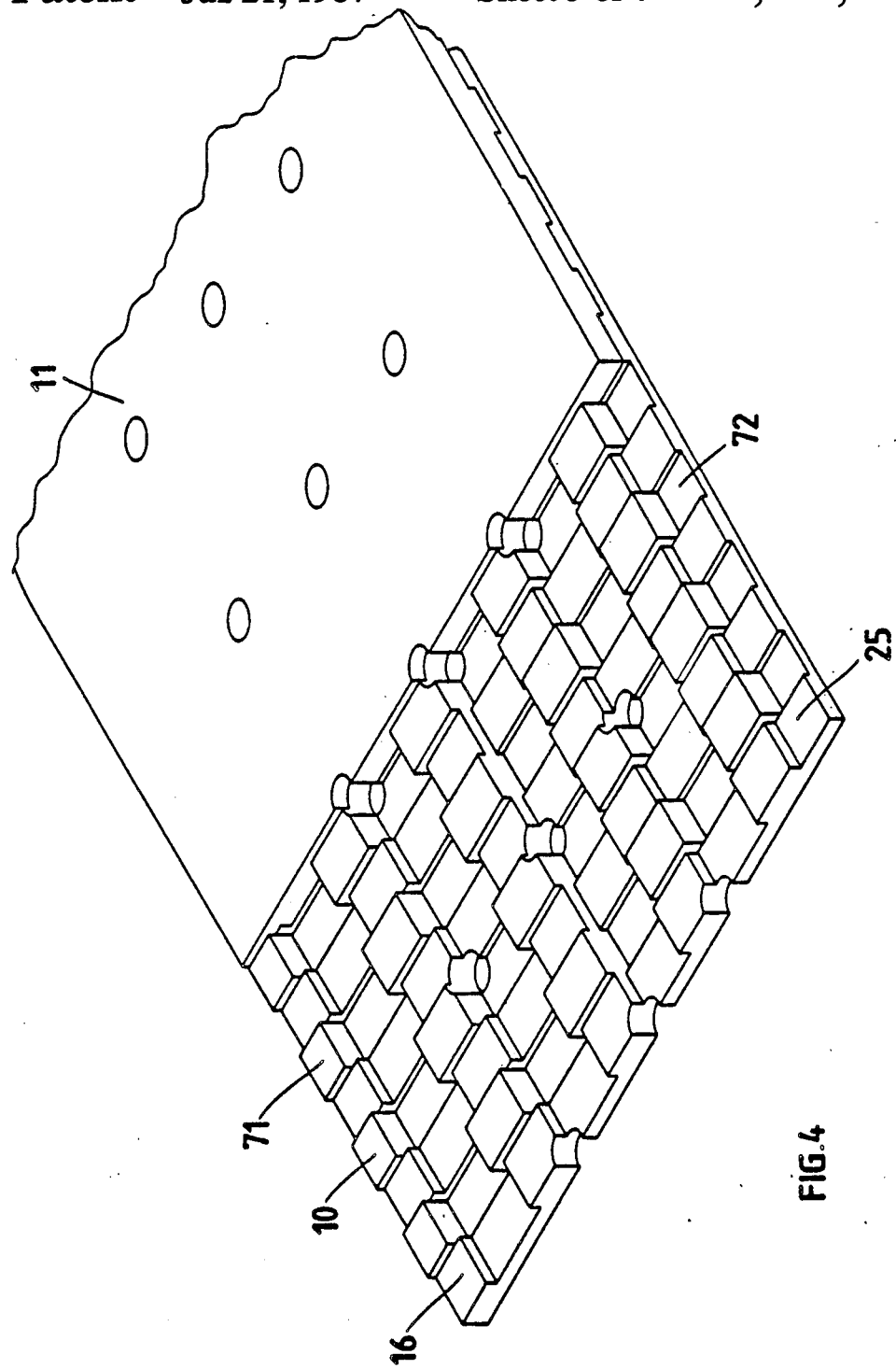
FIG. 4 is a diagrammatic isometric view similar to FIG. 1 showing traction-transmitting formation.

Alternatively or additionally to the lateral crenellations formed on the side edges of the ribs of the segments described above, crenellations or other traction-transmitting formations 71 may be provided on the surfaces of the ribs to be engageable with corresponding formations 72 in the bases of the corresponding grooves as shown in FIG. 4.

It will be noted that by incorporating the reinforcement cords 15 in the ribs it is possible to arrange that they lie on the neutral axis N of the belt thus avoiding undue extension of the cords by bending of the belt and so enhancing the fatigue resistance of the belt structure.

Where the belt shown in FIG. 3 is intended for use as a track for a track-laying vehicle the clamp plates on one surface for example the plates 50, 52, 54, 56 may be provided with drive formations for engagement with the teeth of a drive sprocket of the vehicle, and the opposite series of plates may constitute track pads for engaging the ground surface.

In order to provide improved cushioning of the drive mechanism, raised areas of elastomeric material 65 may be formed on the upper surface of the track, and similar raised areas 66 may be provided between the tread pads to assist in spreading the load when the track is running on soft ground.

We claim:

1. A flexible belt comprising a plurality of belt segments arranged in series in the direction of the length of the belt, each segment having a face shaped to interlock with the face of an adjacent segment when placed in face-to-face relationship with respective faces of successive adjacent segments overlapping along the length of the belt; clamping means arranged to press said overlapping faces of respective adjacent segments towards one another to secure said adjacent segments together, each of the overlapping faces being provided with traction-transmitting formations arranged to interlock with corresponding traction-transmitting formations provided on the other of the overlapping faces so as to key the overlapping faces together said traction-transmitting formations comprising a series of ribs and intervening grooves extending longitudinally of each belt segment, the sides of the ribs having a pattern which interlocks with that of an adjacent segment.

2. A flexible belt according to claim 1 wherein the pattern of the rib sides is crenellated.

3. A flexible belt according to claim 1 wherein said series of ribs and intervening grooves include a rib surface provided with traction-transmitting formations engageable with corresponding formations in the base of a corresponding groove.

4. A flexible belt according to claim 1 wherein the segments are similarly patterned and one rib is formed with a plain side lying on the central longitudinal axis of the segment.

5. A flexible belt according to claim 1 wherein the edges of the segments for abutment with adjacent segments are formed with raised lips to engage the opposite surfaces so as to assist in sealing the respective joints.

6. A flexible belt according to claim 1 wherein the segments are arranged in a half-lapping series.

7. A flexible belt according to claim 1 wherein the clamping means comprises clamping plates on opposite sides of the belt and fixing bolts passing throught the plates and the belt segments to press the clamping plates towards one another.

8. A flexible belt according to claim 7 wherein holes for the bolts are formed along the lines of junction of the segments.

9. A flexible belt comprising a plurality of belt segments, arranged in series in the direction of the length of the belt, each segment having a face shaped to interlock with the face of an adjacent segment when placed in face-to-face relationship with respective faces of successive adjacent segments overlapping along the length of the belt; clamping means arranged to press said overlapping faces of respective adjacent segments towards one another to secure said adjacent segments together, each of the overlapping faces being provided with traction-transmitting formations comprising a series of ribs and intervening grooves extending longitudinally of each belt segment, the sides of the ribs having a crenellated pattern which interlocks with that of an adjacent segment.

* * * * *